(12) United States Patent
Kwon et al.

(10) Patent No.: US 7,573,559 B2
(45) Date of Patent: Aug. 11, 2009

(54) APPARATUS AND METHOD FOR FABRICATING LIQUID CRYSTAL DISPLAY PANEL HAVING A BRIGHT SPOT DEFECT CORRESPONDING TO A PARTICLE IN WHICH AN ALIGNMENT FILM COVERS THE PARTICLE

(75) Inventors: Oh Nam Kwon, Gyeonggi-do (KR); Seung Hee Nam, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 149 days.

(21) Appl. No.: 11/152,185

(22) Filed: Jun. 15, 2005

(65) Prior Publication Data

US 2006/0125988 A1    Jun. 15, 2006

(30) Foreign Application Priority Data

Dec. 9, 2004    (KR)    .................. 10-2004-0103872

(51) Int. Cl.
*G02F 1/13*    (2006.01)
(52) U.S. Cl. .................. 349/192; 349/54; 349/123; 349/126; 349/128
(58) Field of Classification Search ......... 349/123–136, 349/192, 54; 324/770
See application file for complete search history.

(56) References Cited

U.S. PATENT DOCUMENTS

| | | | | |
|---|---|---|---|---|
| 5,585,951 A | * | 12/1996 | Noda et al. | 349/122 |
| 5,926,246 A | * | 7/1999 | Tomita et al. | 349/192 |
| 6,001,277 A | * | 12/1999 | Ichimura et al. | 252/299.4 |
| 6,097,462 A | * | 8/2000 | Koe | 349/123 |
| 6,184,959 B1 | | 2/2001 | Izumi | |
| 6,285,427 B1 | | 9/2001 | Lee et al. | |
| 6,399,165 B1 | | 6/2002 | Kwon et al. | |
| 6,529,254 B1 | * | 3/2003 | Suganuma | 349/104 |
| 6,713,135 B2 | * | 3/2004 | Gibbons et al. | 428/1.26 |
| 2002/0018966 A1 | * | 2/2002 | Tanioka et al. | 430/327 |

FOREIGN PATENT DOCUMENTS

| | | |
|---|---|---|
| JP | 10-325957 | 12/1998 |
| JP | 2004-226475 | 8/2004 |
| JP | 2004-302260 | 10/2004 |
| JP | 2004-347668 | 12/2004 |
| KR | 10-2003-0039401 | 5/2003 |

OTHER PUBLICATIONS

Communication from UK Patent Office dated Aug. 19, 2005.

* cited by examiner

*Primary Examiner*—David Nelms
*Assistant Examiner*—John Heyman
(74) *Attorney, Agent, or Firm*—McKenna Long & Aldridge LLP

(57) ABSTRACT

A method of fabricating a liquid crystal display panel includes forming a first alignment film on a first substrate, aligning the first alignment film in a first alignment direction by a first rubbing process, forming a second alignment film on a second substrate, aligning the second alignment film in a second alignment direction by a second rubbing process, attaching the first and second substrates to each other, and re-aligning a substantially non-uniformly aligned area on at least one of the first and second substrates by irradiating a light irradiating device of one of an ultraviolet ray and a laser beam.

18 Claims, 6 Drawing Sheets

APPARATUS AND METHOD FOR FABRICATING LIQUID CRYSTAL DISPLAY PANEL HAVING A BRIGHT SPOT DEFECT CORRESPONDING TO A PARTICLE IN WHICH AN ALIGNMENT FILM COVERS THE PARTICLE

This application claims the benefit of the Korean Patent Application No. P2004-103872 filed on Dec. 9, 2004 which is hereby incorporated by reference.

BACKGROUND OF THE INVENTION

1. Field of the Invention

The present invention relates to a liquid crystal display panel, and more particularly to an apparatus and a method for fabricating a liquid crystal display panel that improve a picture quality by improving alignment of an alignment film.

2. Discussion of the Related Art

Generally, a liquid crystal display (LCD) device controls the light transmissivity of liquid crystal cells in accordance with a video signal to display a picture corresponding to the video signal in a liquid crystal display panel. The liquid crystal display device includes a liquid crystal display panel in which the liquid crystal cells are arranged in an active matrix shape, and drives circuitry of the liquid crystal display device. Liquid crystal display devices can be divided into two classes in accordance with the electric field direction when liquid crystal is driven. A twisted nematic (TN) mode where a vertical direction electric field is used and an in-plan switch (IPS) mode where a horizontal direction electric field is used.

The TN mode LCD is driven by a vertical electric field between a pixel electrode and a common electrode, which are arranged to be opposite in the upper substrate. The TN mode LCD has an advantage in that its aperture ratio is large but a disadvantage in that its viewing angle is small. On the other hand, the IPS mode LCD is driven by a horizontal electric field between the pixel electrode and the common electrode, which are arranged in parallel in the lower substrate, and it has an advantage in that its viewing angle is large but a disadvantage in that its aperture ratio is small.

Figure 1:
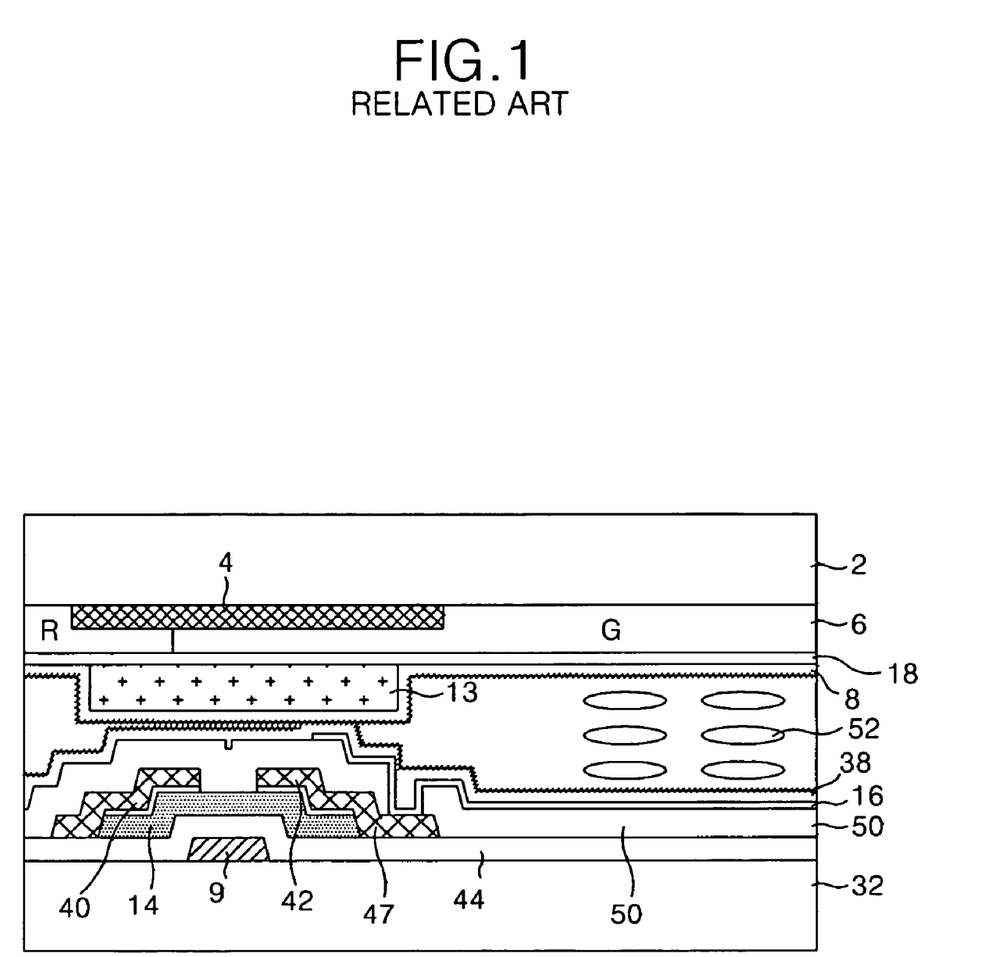
FIG. 1 is a cross-sectional view illustrating a related art liquid crystal display panel.

FIG. 1 is a cross-sectional diagram representing a liquid crystal display panel of the TN mode in the related art. Referring to FIG. 1, the TN mode liquid crystal display panel includes an upper array substrate (often referred to as a color filter array substrate) having a black matrix 4, a color filter 6, a common electrode 18, and an upper alignment film 8, which are sequentially formed on an upper substrate 2, a lower array substrate having a thin film transistor (hereinafter, referred to as "TFT"), a pixel electrode 16 and a lower alignment film 38, which are formed on a lower substrate 32, and a liquid crystal injected into the inner space between the upper array substrate and the lower array substrate. On the other hand, the IPS mode liquid crystal display panel have the common electrode 18 formed on the lower substrate 32 and an overcoat layer formed on the color filter 6 of the upper substrate 2, wherein the overcoat layer is to compensate for the stepped difference of the color filter 6.

In the upper array substrate, the black matrix 4 is formed on the upper substrate 2 and corresponds to the areas of gate lines and data lines (not shown) and a TFT area of a lower plate, and it provides a cell area where a color filter 6 is to be formed. The black matrix 4 prevents light leakage and absorbs the external light, thereby increasing contrast. The color filter 6 is formed to extend to the black matrix 4 and the cell area divided by the black matrix 4. The color filter 6 is formed by R, G and B to produce R, G and B colors. A common voltage is supplied to the common electrode to control the movement of the liquid crystal. The spacer 13 keeps a cell gap between an upper array substrate and a lower array substrate.

The TFT includes a gate electrode 9 formed on the lower substrate 32 along with a gate line, semiconductor layers 14 and 47 overlapping the gate electrode 9 and a gate insulating film 44, and source/drain electrodes 40 and 42 formed with a data line (not shown) and the semiconductor layers 14 and 47 in the same process. The TFT supplies a pixel signal to a pixel electrode 16 from the data line in response to a scan signal from the gate line. The pixel electrode 16 is in contact with a drain electrode 42 of the TFT through a passivation film 50, wherein the passivation film is formed of a transparent conductive material with high light transmissivity.

Figure 2:
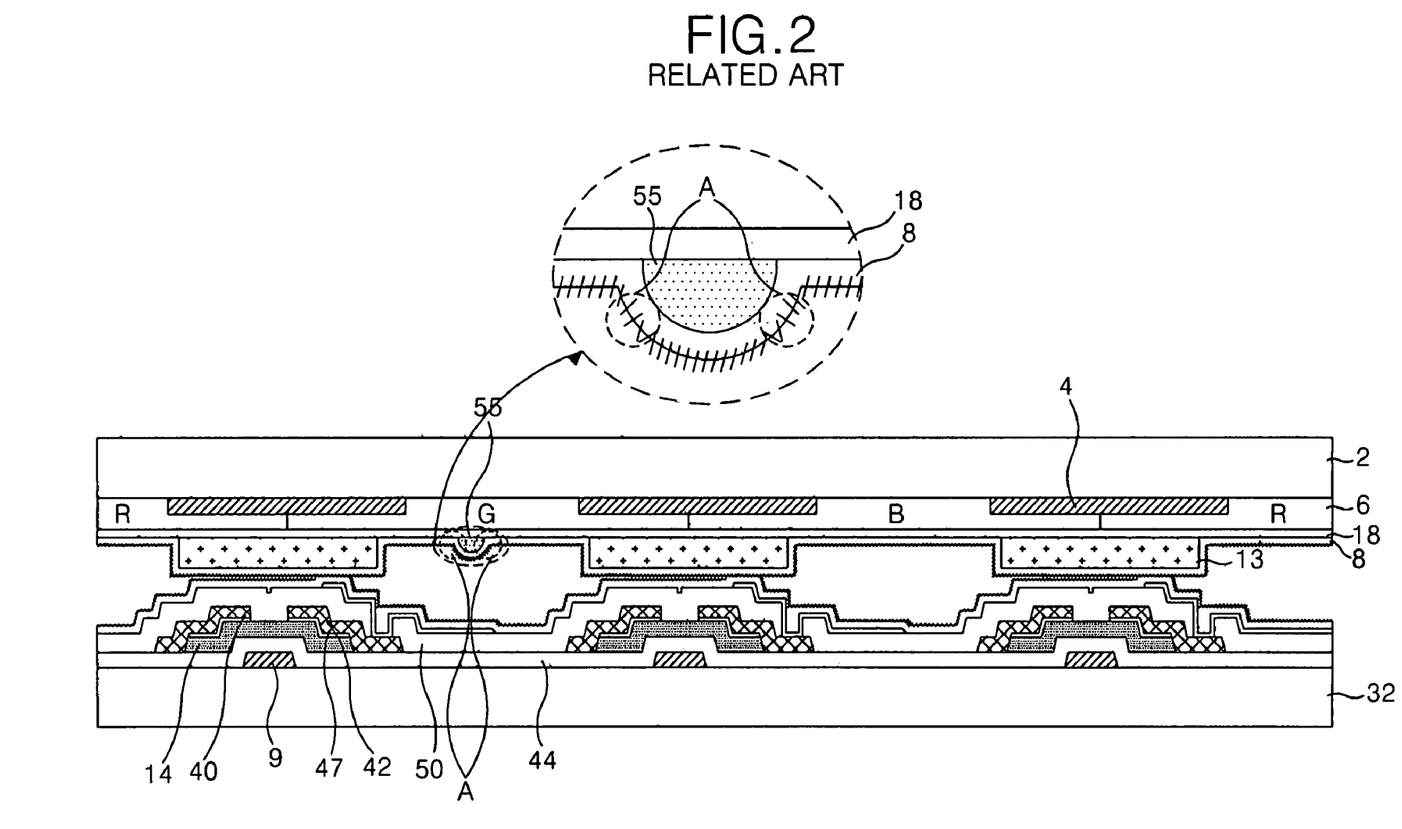
FIG. 2 is a cross-sectional view to explain an alignment defect which is generated by a particle inserted during a fabrication process.
Figure 3:
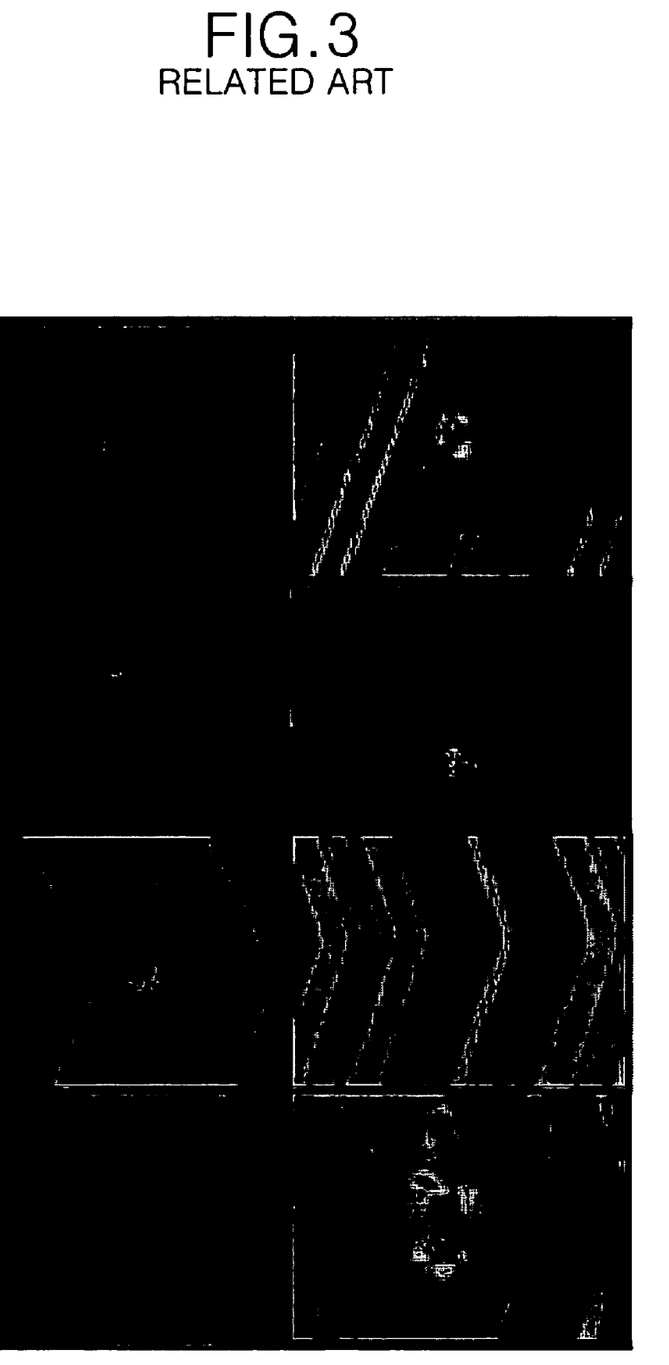
FIG. 3 is a picture illustrating a bright spot which appears by an alignment defect when producing a picture.

In the related art LCD device, in the chamber within which a designated thin film is formed or in case that it is moved to a separate chamber or a third location to form another thin film, a particle 55 may be frequently formed between the thin films, e.g., the common electrode 18 and an upper alignment film 18 as shown in FIG. 2. A portion of the alignment film 18 corresponding to the particle 55 cannot be uniformly rubbed in a rubbing process, thereby generating a non-uniform alignment area A. The non-uniform alignment area A causes light leakage, thus a spot can appear in the picture as shown in FIG. 3. Generally, a dark spot appears when high gray is produced, and a bright spot appears when low gray is produced. Herein, human eyes are relatively more sensitive to the bright spot than the dark spot, thus a stricter standard is given to the bright spot defect than the dark spot defect when examining the panel. Accordingly, a method is required to prevent the light leakage and the bright spot by repairing the non-uniform alignment area A and to improve the picture quality.

SUMMARY OF THE INVENTION

Accordingly, the present invention is to direct an apparatus and method for fabricating a liquid crystal display panel that substantially obviates one or more of the problems due to limitations and disadvantages of the related art.

An object of the present invention is to provide an apparatus and method for fabricating a liquid crystal display panel that improves a picture quality by re-aligning a non-uniform alignment area.

Additional features and advantages of the invention will set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in advance with the purpose of the present invention, as embodied and broadly described, the an apparatus for fabricating a liquid crystal display panel includes a light irradiation device generating one of an ultraviolet ray and a laser beam on a liquid crystal display panel to irradiate to a substantially non-uniformly aligned area of one of upper and lower alignment films, to re-align the non-uniformly aligned area of the one of the upper and lower alignment films.

In another embodiment of the present invention, a method of fabricating a liquid crystal display panel includes performing a first alignment on at least one of upper and lower alignment films in a designated alignment direction, and performing a second alignment on a non-uniformly aligned area by irradiating a light irradiating device of one of an ultraviolet ray and a laser beam.

In a further embodiment of the present invention, a method of fabricating a liquid crystal display panel includes forming a first alignment film on a first substrate, aligning the first alignment film in a first alignment direction by a first rubbing process, forming a second alignment film on a second substrate, aligning the second alignment film in a second alignment direction by a second rubbing process, attaching the first and second substrates to each other, and re-aligning a substantially non-uniformly aligned area on at least one of the first and second substrates by irradiating a light irradiating device of one of an ultraviolet ray and a laser beam.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Hereinafter, an embodiment of the present invention will be described in detail with reference to FIGS. 4 to 6.

Figure 4:
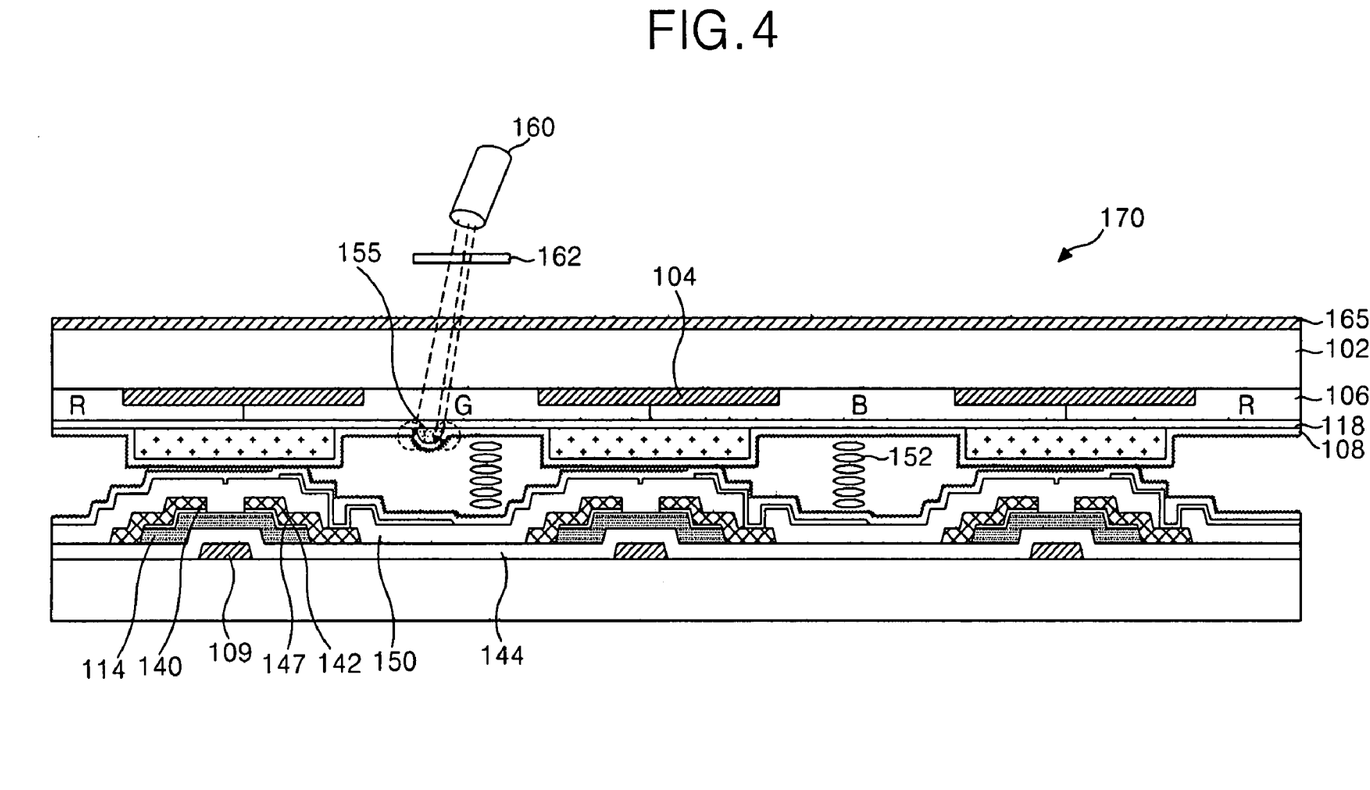
FIG. 4 is a cross-sectional view illustrating a fabricating method of a liquid crystal display panel according to an embodiment of the present invention.
Figure 5:
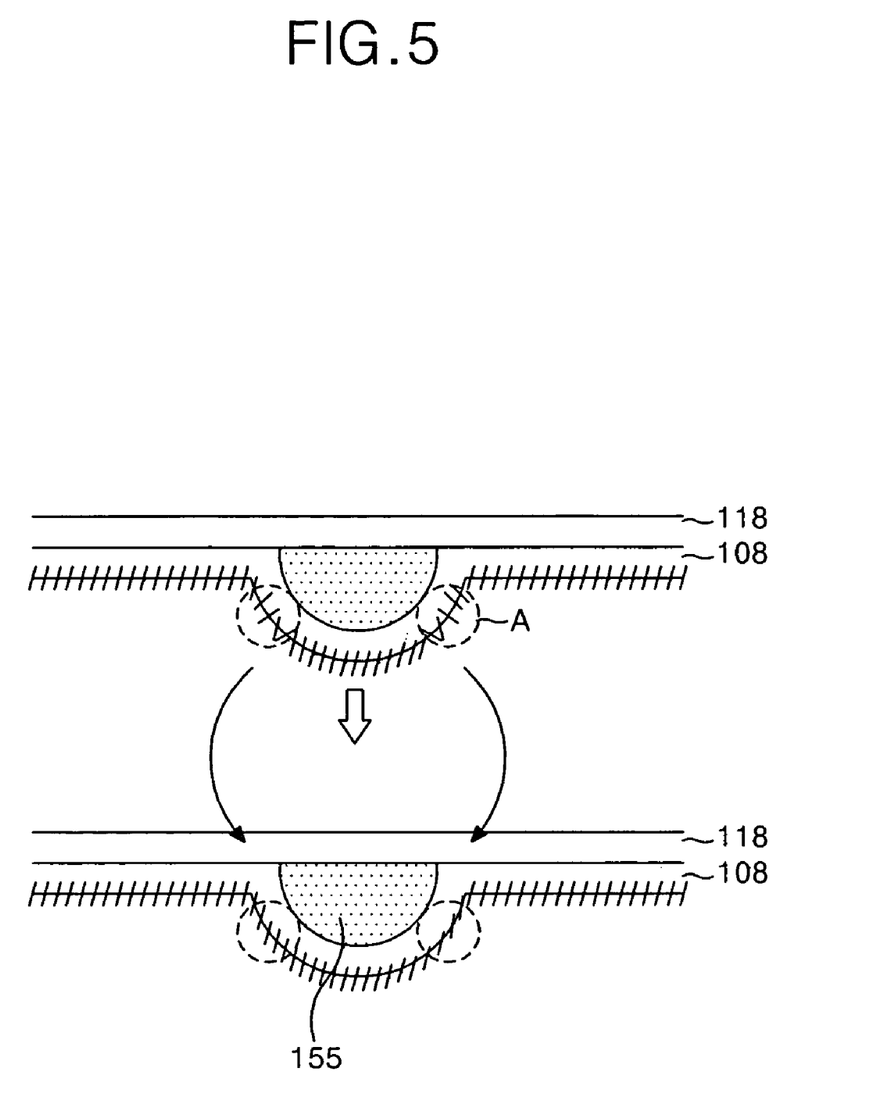
FIG. 5 is an enlarged view of FIG. 2 to illustrate that a non-uniform alignment area is re-aligned.

FIG. 4 is a cross-sectional view illustrating a fabricating method of a liquid crystal display panel according to an embodiment of the present invention.

A fabricating apparatus of a liquid crystal display panel in exemplary embodiments of the present invention include a light irradiation device 160 to at least partially re-align an alignment film by irradiating at least one of an ultraviolet ray and a laser to the alignment film which is aligned in a first direction for a liquid crystal alignment of a liquid crystal display panel 170. The light irradiation device 160 is aligned over the liquid crystal display panel 170.

The liquid crystal display panel 170 includes an upper array substrate (often referred to as a color filter array substrate) having a black matrix 104, a color filter 106, a common electrode 118, and an upper alignment film 108 which are sequentially formed on an upper substrate 102, a lower array substrate (often referred to as a thin film transistor array substrate) having a thin film transistor (TFT), a pixel electrode 116 and a lower alignment film 138 which are formed on a lower substrate 132, and liquid crystal 152 injected into an inner space between the upper array substrate and the lower array substrate. More specifically, in the upper array substrate, the black matrix 104 is formed on the upper substrate 102 and corresponds to an area of gate lines and data lines (not shown) and a TFT area of a lower plate, and it provides a cell area where a color filter 106 is to be formed. The black matrix 104 prevents light leakage and absorbs external light, thereby increasing contrast. The color filter 106 is formed to extend onto the black matrix 104 and on the cell area divided by the black matrix 104. The color filter 106 having R, G and B colors produces R, G and B colors. A common voltage is supplied to the common electrode 118 to control the movement of the liquid crystal. On the other hand, in an IPS mode liquid crystal display panel, the common electrode 118 is formed on the lower substrate 132, and an overcoat layer may be formed on the color filter 106 of the upper substrate 102 to compensate for a step difference of the color filter 106. The spacer 113 maintains a cell gap between an upper array substrate and a lower array substrate.

In the lower array substrate, the TFT includes a gate electrode 109 formed on the lower substrate 132 along with a gate line, semiconductor layers 114 and 147 overlapping the gate electrode 109 with a gate insulating film 144 therebetween, and source/drain electrodes 140 and 142 formed together with a data line (not shown) with the semiconductor layers 114 and 147 therebetween. The TFT supplies a pixel signal to a pixel electrode 116 from the data line in response to a scan signal from the gate line.

The pixel electrode 116 is in contact with a drain electrode 142 of the TFT with a passivation film 150 therebetween, wherein the passivation film 150 is of a transparent conductive material with high light transmissivity. Upper/lower alignment films 108 and 138 for the liquid crystal alignment are formed by performing a rubbing process after spreading an alignment material, such as polyimide.

The light irradiation device 160 generates a laser beam or an ultraviolet ray and irradiates at least one of the laser beam and the ultraviolet ray to a non-uniform alignment area A of the liquid crystal display panel 170. Accordingly, the non-uniform alignment area A is re-aligned. This will be described further in detail as follows.

Generally, in the chamber within which a designated thin film is formed or in case a device that it is moved to a separate chamber or a third location to form another thin film, a particle 155 may be settled between the common electrode 118 and the upper alignment film 108, as shown in FIG. 4. At this moment, a portion of the upper alignment film 108 corresponding to the particle 155 may not uniformly rubbed in a rubbing process, thereby generating a non-uniform alignment area A.

The light irradiation device 160 according to embodiments of the present invention irradiates at least one of the laser beam or the ultraviolet ray to the non-uniform alignment area A. The molecular chain of the alignment film illuminated by the laser beam or the ultraviolet ray is re-arranged to be in a designated direction, thus the non-uniform alignment area A is re-aligned, as shown in FIG. 5. Herein, the alignment direction in which it is aligned by the laser beam or the ultraviolet ray is the same as the alignment direction of the alignment film except for the non-uniform alignment area A. Accordingly, the alignment is uniform and the liquid crystal is uniformly aligned, thereby improving the picture quality, e.g., the light leakage and the bright spot are minimized.

The wavelength of at least one of the ultraviolet ray and the laser beam is about 200~400 nm, and the energy of the ultraviolet ray is about 0.1~3 J/cm$^2$. Further, the laser beam is generated by at least one of an Nd yttrium aluminum garnet YAG and a diode laser. Herein, the Nd yttrium aluminum garnet YAG is a laser which oscillates by use of neodymium Nd solid and uses a YAG crystal as an amplification medium, and the diode laser is a laser which oscillates by use of the light generated upon the energy level change or the carrier movement of the joining part of an n-type semiconductor and a p-type semiconductor.

On the other hand, in case of re-aligning the alignment film by using the ultraviolet ray, a polarizer 165 may be further included in the rear surface of the upper substrate 102 where the upper alignment film 108 and the thin films are formed, and the ultraviolet ray is irradiated to the non-uniform alignment area A after being polarized by the polarizer 165. Further, an embodiment of the present invention may include a focus controller 162, e.g., a lens, a mirror and so on, which is located between the light irradiation device 160 and the liquid crystal display panel 170 to control a focal distance and an irradiation area of the ultraviolet ray or the laser.

In this way, the fabricating apparatus of the liquid crystal display panel according to an embodiment of the present invention irradiates the laser beam and the ultraviolet ray to the non-uniform alignment area A, which is caused by an exterior particle that settled between thin films in during the fabricating process of the thin films of the liquid crystal display panel 170, thereby re-aligning the non-uniform alignment area A. Accordingly, the liquid crystal is uniformly aligned to prevent the light leakage and the bright spot, thereby improving the picture quality.

Figure 6:
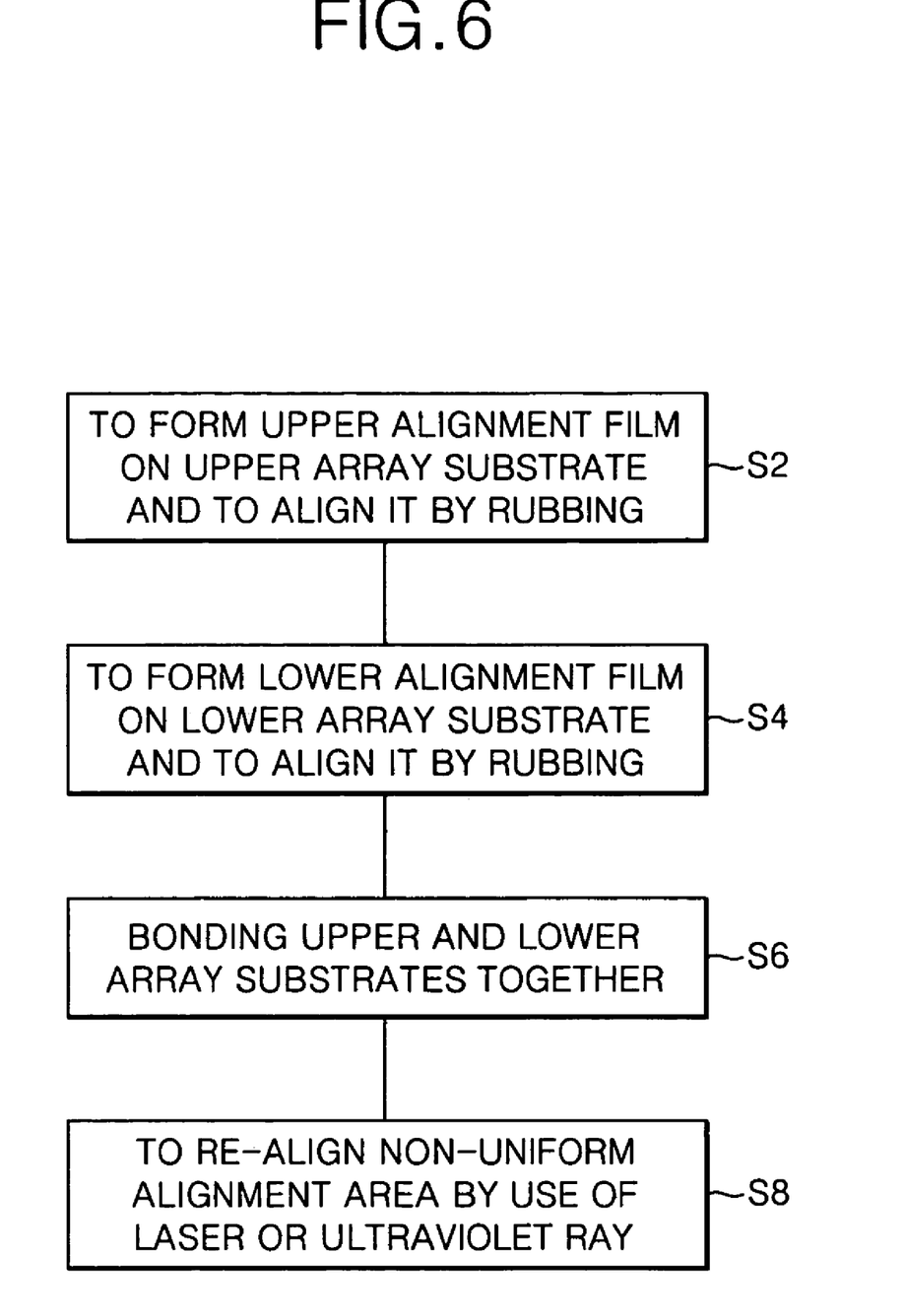
FIG. 6 is a flow chart to explain a fabricating method of a liquid crystal display panel according to an embodiment of the present invention.

FIG. 6 is a flow chart to explain the fabricating method of the liquid crystal display panel according to an embodiment of the present invention.

In the fabricating method of the liquid crystal display panel having the step of forming upper and lower alignment films 108 and 138 having a liquid crystal 152 therebetween to align the liquid crystal 152, according to an embodiment of the present invention, the step of forming the upper and lower alignment films 108 and 138 includes the steps of performing a first alignment on at least one alignment film of the upper and lower alignment films 108 and 138 in a designated direction, and performing a second alignment on the non-uniform area by irradiating at least one of the ultraviolet ray and the laser beam to the area, which is non-uniformly aligned, in the first-aligned alignment film.

Hereinafter, in reference with FIGS. 5 and 6, the fabricating method of the liquid crystal display panel according to an embodiment of the present invention will be explained in more detail as follows.

After sequentially forming the black matrix 104, the color filter 106, the common electrode 118 and the spacer 113 on the upper substrate 102, the upper alignment film 108 is printed. Thereafter, the rubbing process is performed to have the surface of the upper alignment film 108 first-aligned in the designated direction. Hereby, the upper array substrate (or, the color filter array substrate) is formed (S2).

Further, the gate line and the data line 140, the thin film transistor, which is formed at the intersection area of the gate line and the data line, and the pixel electrode 116 connected to the thin film transistor are formed on the lower substrate 132 by a separate process. And then, the lower alignment film 138 is printed. After the rubbing process is performed, the surface of the lower alignment film 138 is aligned. Hereby, the lower array substrate (or thin film transistor array substrate) is formed (S4). When the liquid crystal display panel is of IPS mode, the common electrode 118 is formed on the lower substrate 132 and an overcoat layer is formed on the color filter 106 of the upper substrate 102.

The upper substrate and the lower substrate are bonded together with the liquid crystal therebetween to form the liquid crystal display panel (S6). Herein, in case of the particle 155 inserted between the thin films, e.g., on the common electrode 118 and the upper alignment film 108, the upper alignment film 108 of the area corresponding to the particle 155 is non-uniformly aligned by the rubbing process. At least one of a laser beam and an ultraviolet ray is irradiated onto the non-uniform alignment area A by using the light irradiation device 160 shown in FIG. 4. The molecular chain is realigned in a designated direction in the non-uniform alignment area A to which the laser beam or the ultraviolet ray is irradiated, thus the non-uniform alignment area A is re-aligned. Herein, the alignment direction in which it is aligned by the laser beam and the ultraviolet ray is the same as the alignment direction of the alignment film. Accordingly, the whole alignment becomes uniform and the liquid crystal is uniformly aligned, thereby improving the picture quality, i.e., the light leakage and the bright spot are minimized. Herein, the wavelength of at least one of the ultraviolet ray and the laser beam is about 200~400 nm, and the energy of the ultraviolet ray is about 0.1~3 j/cm$^2$. Further, the laser beam is generated by using at least one of a ND YAG laser and a diode laser, and the ultraviolet ray is generated by at least one of a mercury lamp and a halogen lamp.

On the other hand, in the case of re-aligning the alignment film by using the ultraviolet ray, the rear surface of the upper substrate 102, where the upper alignment film 108 and the thin films are formed further includes the polarizer 165. The ultraviolet ray is irradiated to the non-uniform alignment area A after being polarized by the polarizer 165. Further, an embodiment of the present invention includes a focus controller 162 located between the light irradiation device 160 and the liquid crystal display panel 170, thereby enabling control of a focal distance and an irradiation area of the ultraviolet ray or the laser.

In this way, the method of re-aligning the non-uniform alignment area, which is caused by a particle, through using a laser beam or an ultraviolet ray can be easily applied to the liquid crystal display panel of electrical controlled birefringence ECB and a vertical alignment VA mode, as well as to the liquid crystal display panel of IPS mode and the liquid crystal display panel of TN mode.

As described above, the fabricating apparatus and method of the liquid crystal display panel according to an embodiment of the present invention irradiates at least one of a laser beam and an ultraviolet ray to the non-uniform alignment area, which is caused by the particle inserted between the thin films during the fabricating process of the liquid crystal display panel, such that the non-uniform alignment area is re-aligned. Accordingly, the alignment becomes uniform and the liquid crystal is aligned uniformly, thereby improving the picture quality, i.e., the light leakage and the bright spot are minimized.

It will be apparent to those skilled in the art that various modifications and variations can be made in the apparatus and method for fabricating liquid crystal display panel of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display panel, comprising:

performing a first alignment on at least one of upper and lower alignment films; and performing a second alignment on a bright spot defect corresponding to a particle at the first aligned film by irradiating light generated from a light irradiating device, wherein the first and second alignments have substantially the same alignment direction, wherein one of the alignment films covers the particle.

2. The method according to claim 1, wherein the light includes one of an ultraviolet ray and a laser beam.

3. The method according to claim 2, wherein the one of the ultraviolet ray and the laser beam has a wavelength of about 200 to 400 nm.

4. The method according to claim 2, wherein the one of the ultraviolet ray and the laser beam has an energy of about 0.1~3 J/cm$^2$.

5. The method according to claim 1, further comprising:

forming a polarizer at a rear surface of the upper substrate where the upper alignment film is formed.

6. The method according to claim 2, wherein the laser beam is generated by one of an Nd YAG laser and a diode laser.

7. The method according to claim 2, wherein the ultraviolet ray is generated by one of a mercury lamp and a halogen lamp.

8. The method according to claim 1, further comprising:

controlling an irradiation area and a focal distance of the light by using a focus controller located between the light irradiation device and the liquid crystal display panel.

9. A method of fabricating a liquid crystal display panel, comprising:

forming a first alignment film on a first substrate;

aligning the first alignment film in a first alignment direction;

forming a second alignment film on a second substrate;

aligning the second alignment film in a second alignment direction;

attaching the first and second substrates to each other; and re-aligning a non-uniformly aligned area on at least one of the first and second substrates, wherein one of the first and second alignment films covers the particle.

10. The method according to claim 9, wherein the re-aligning a non-uniformly aligned area is performed by irradiating light generated from a light irradiating device.

11. The method according to claim 10, wherein the light irradiating device generates one of an ultraviolet ray and a laser beam.

12. The method according to claim 9, wherein the first and second alignment directions are substantially the same.

13. The method according to claim 10, wherein the light has a wavelength of about 200 to 400 nm.

14. The method according to claim 10, wherein the light has an energy of about 0.1~3 J/cm$^2$.

15. The method according to claim 10, wherein the laser beam is generated by one of an Nd YAG laser and a diode laser.

16. The method according to claim 10, wherein the ultraviolet ray is generated by one of a mercury lamp and a halogen lamp.

17. The method according to claim 9, further comprising:

controlling an irradiation area and a focal distance of the light by using a focus controller located between the light irradiation device and the liquid crystal display panel.

18. The method according to claim 9, wherein the aligning the first and second alignment films are performed by first and second rubbing processes, respectively.

* * * * *